United States Patent
Harrison et al.

(10) Patent No.: US 6,691,113 B1
(45) Date of Patent: Feb. 10, 2004

(54) PERSISTENT DATA STORAGE FOR CLIENT COMPUTER SOFTWARE PROGRAMS

(75) Inventors: Benjamin R. Harrison, Somerville, MA (US); David A. Kranz, Arlington, MA (US); Murray S. Mazer, Arlington, MA (US); Spiro Michaylov, Arlington, MA (US); Carl A. Soeder, Beverley, MA (US)

(73) Assignee: Curl Corporation, Cambridge, MA (US)

( * ) Notice: Subject to any disclaimer, the term of this patent is extended or adjusted under 35 U.S.C. 154(b) by 291 days.

(21) Appl. No.: 09/672,713

(22) Filed: Sep. 28, 2000

(51) Int. Cl.⁷ .............................................. G06F 17/30
(52) U.S. Cl. ............................................ 707/10; 709/9
(58) Field of Search ............... 707/10, 9; 717/168–178; 715/513

(56) References Cited

U.S. PATENT DOCUMENTS

| | | | | |
|---|---|---|---|---|
| 5,919,247 A | * | 7/1999 | Van Hoff et al. | 709/217 |
| 6,029,258 A | * | 2/2000 | Ahmad | 714/46 |
| 6,154,748 A | * | 11/2000 | Gupta et al. | 707/102 |
| 6,189,000 B1 | * | 2/2001 | Gwertzman et al. | 707/1 |
| 6,240,442 B1 | * | 5/2001 | Domenikos et al. | 709/203 |
| 6,272,536 B1 | * | 8/2001 | van Hoff et al. | 709/217 |
| 6,360,254 B1 | * | 3/2002 | Linden et al. | 709/219 |
| 2002/0111942 A1 | * | 8/2002 | Campbell et al. | 707/3 |

FOREIGN PATENT DOCUMENTS

EP    0 631 229 A2    12/1994

OTHER PUBLICATIONS

"HOWTO: Using Scratch Space from Your Java Applet," http://support.microsoft.com/support/kb/articles/Q172/2/00.asp, downloaded Mar. 20, 2001 (4 pp.).

"ClientStore Class", http://www.microsoft.com/java/sdk/40/packages/pkg_clientstg_11.htm, dowloaded Dec. 27, 1999 (2 pp.).

"com.ms.io.clientstorage Package Overview," htt://www-.microsoft.com/java/sdk/40/packages/pkg_clientstg_o.htm, downloaded Dec. 27, 1999 (3 pp.).

"ClientStore Class Fields," http://www.microsoft.com/java/sdk/40/packages/pkg_clientstg_40.htm, downloaded Dec. 27, 1999 (1 p.).

(List continued on next page.)

*Primary Examiner*—Safet Metjahic
*Assistant Examiner*—Cam Linh Nguyen
(74) *Attorney, Agent, or Firm*—Hamilton, Brook, Smith & Reynolds, P.C.

(57) ABSTRACT

Persistent data storage for client computer software programs is provided using a repository that enables client computer software programs to store data securely on a client computer system, subsequently retrieve that data, and optionally share the data in a controlled fashion with authorized client computer software programs. The present invention can be used by both trusted and untrusted client computer software programs that either reside locally on the client computer system or are downloaded from a server computer system. A benefit of the present invention is that it allows untrusted applets to have access to persistent storage without compromising the integrity of the client computer system. Since the present invention controls persistent storage space, not the programmer of the client computer software program, the burden of insuring storage integrity and security is removed from the programmer. In addition to basic integrity and security features, the present invention provides automatic data format conversion for client computer software programs reading/writing data in the data repository, a commit operation to force in-memory repository data to disk, and automatic expiration to delete the repository after a predetermined time period. The repository can be pre-limited to a maximum size and shared among multiple client computer software programs.

42 Claims, 5 Drawing Sheets

OTHER PUBLICATIONS

"ClientStoreFile Class," http://www.microsoft.com/java/sdk/40/packages/pkg_clientstg_41.htm, downloaded Dec. 27, 1999 (1 p. ).

"ClientStoreManager Class," http://www.microsoft.com/java/sdk/40/packages_clientstg_2.htm, downloaded Dec. 27, 1999 (1 p.).

"ClientStoragePermission Class," http:/www.microsoft.com/java/sdk/40 packages/pkg_permissions_2.htm, downloaded Dec. 27, 1999 (1 p.).

"Introducing Castanet," (internet document), http://web1.archive.org/web/19981205015610/http://www.marimba.com/doc/30/intro/intro-castanet.fm.htr, downloaded Nov. 27, 2002.

Gong, L., "Java Security Architecture (JDK 1.2) Version 1.0", *Java Documentation*, Dec. 6, 1998, pp. 1–62.

Fuenfrocken, S., "Integrating Java–based Mobile Agents into Web Servers Under Security Concerns," *Proc. of 31st Annual Hawaii International Conference on System Sciences, IEEE 1998*, p. 34–43.

"Client–Side JavaScript Guide—Version 1.3, Chapter 13", Netscape Communications Corporation, Netscape Documentation, Jun. 1999, pp. 201–210.

Wallach, D.S. et al., "Extensible Security Architectures for Java," *Proc. of ACM Symposium on Operating Systems Principles*, 1997, pp. 1–26.

Kleindienst, J. et al., "Lessons Learned from Implementing the CORBA Persistent Object Service," *ACM SIGPLAN Notices, Assoc. for Computing Machinery*, vol. 31, No. 10, Oct. 1, 1996, p. 150–167.

* cited by examiner

PERSISTENT DATA STORAGE FOR CLIENT COMPUTER SOFTWARE PROGRAMS

BACKGROUND OF THE INVENTION

This invention relates generally to data storage in computers and more specifically to providing persistent storage for client computer software programs in a client/server computer environment.

Providing persistent storage for client computer software programs is particularly important for computer systems using the World Wide Web ("WWW") or "Web". The Web is the total set of interlinked hypertext documents residing on HyperText Transfer Protocol ("HTTP") servers all around the world. These servers form the Internet, a worldwide collection of computers, networks and gateways that use the TCP/IP suite of protocols to communicate with one another. Documents on the World Wide Web, called pages or Web pages, can be written in Hypertext Markup Language ("HTML"). These documents are identified by Uniform Resource Locators ("URLs") that specify the particular machine and pathname by which a document can be accessed. Codes, called tags, embedded in an HTML document associate particular words and images in the document with other URLs such that a user can link to another document, stored on any server on the network, by the press of a key or the click of a pointing device (e.g., mouse). These files may contain text (in a variety of fonts and styles), graphics images, movie files, and sounds, as well as Java™ applets, ActiveX® controls, or other small embedded software programs that execute when the user activates them by activating a link. These tags, used in association with text, create structured text. The World Wide Web was developed by Timothy Berners-Lee in 1989 for the European Laboratory for Particle Physics (CERN).

Content on the World Wide Web is created and controlled using various computer programming languages. Computer programming languages are used to define a sequence of data and instructions that can ultimately be processed and executed by a computer. The instructions can be translated, from the source code expressed using the programming language to the machine code that the computer works more directly with, by means of another program, such as a compiler or interpreter. Examples of languages for Web content creation and delivery are: HTML; the Java™ computer programming language; and the Curl™ computer programming language. The Curl computer programming language is developed by Curl Corporation, Cambridge, Mass.

HTML is an application of the Standard Generalized Markup Language ("SGML") and uses tags to mark content elements, such as text and graphics, in a document to indicate how Web browsers should display this content to the user and how the content should respond to user actions, such as activation of a link by means of a key press or mouse click. HTML is defined, in various versions, by the Internet Engineering Task Force ("IETF") and by the World Wide Web Consortium ("W3C").

Java is an object-oriented programming language, developed by Sun Microsystems, Inc. Similar to C++, Java is smaller, more portable, and easier to use than C++ because it is more robust and it manages memory on its own. Java was also designed to be secure and platform-neutral. Java programs are compiled into bytecodes, which are similar to machine code and are not specific to any platform, making it a useful language for programming Web applications, since users access the Web from many types of computers. Currently, the most widespread use of Java is in programming small applications, or applets, for the World Wide Web.

The Curl computer programming language is designed to present a single, coherent linguistic basis for the expression of Web content at levels ranging from simple formatted (structured) text to complex object-oriented programs. The Curl computer programming language is intended to be a gentle slope system, accessible to content creators at all skill levels ranging from novice content developers to experienced computer programmers. More information on the Curl computer programming language can be found in the paper entitled "*Curl: A Gentle Slope Language For The Web*" by M. Hostetter, D. Kranz, C. Seed, C. Terman and S. Ward of the Massachusetts Institute of Technology Laboratory for Computer Science.

The Curl computer programming language presents an object-oriented system that comprises both a static (compile-time) mode and a dynamic (run-time) mode. At compile-time, an object's structure, or class definition (i.e., data and methods) is described. At run-time an instance of an object, based upon its class definition, can be created. The run-time object can then act upon, and be acted upon by, other objects created in the run-time system.

Most Web programming languages, provide a limited mechanism for storing client persistent data. Some prior art systems that provide storage for client computer software programs include: server-side storage systems, the Windows registry system and Microsoft Client Storage library. Server-side storage systems simply utilize data storage mechanism available on the server (e.g., relational database management systems) to provide data storage to client computer software programs. The client computer software program is required to interact with the server in order to read or write data.

The Windows registry is a central hierarchical database that Windows operating systems use to store information necessary to configure the system for one or more users, applications, and hardware devices. The Registry contains information that the Windows operating system references during operation, such as profiles for each user, the applications installed on the computer and the types of documents each can create, property sheet settings for folders and application icons, what hardware exists on the system, and which ports are being used. Web applets do not have direct access to read and write values in the Windows registry.

Web applications (applets) can store information on client computers using a mechanism know as "cookies". On the World Wide Web a cookie is a block of data that a Web server stores on a client system when a user visits a Web site. When the user returns to the same Web site, the browser sends a copy of the cookie back to the server. Cookies are used to identify users, to instruct the server to send a customized version of the requested Web page, to submit account information for the user, and for other administrative purposes. The original purpose of cookies was to allow server-side programs to have the ability to save state on client machines. Cookie information is passed between the client-side (Web browser) and the server-side (Web server) in the HTTP request/response headers. Cookies store information by including a SET-COOKIE header as part of a Web page returned to a client computer software program (e.g., Web browser). SET-COOKIE takes a series of parameters that allow information about the cookie to be customized. Data can be stored by use of the NAME=VALUE parameter.

In a minimal configuration, NAME=VALUE is the only required parameter of the SET-COOKIE header. VALUE is a string of characters (excluding semi-colon, comma and white space) that contains the data that the Web server wants to store on the client computer. NAME=VALUE is the only required parameter, however, other parameters may be included with the SET-COOKIE header. An EXPIRES=DATE parameter is used inform the server when the data in the cookie is no longer valid. Once the expiration date has been reached, the cookie will no longer be stored or given out. Additionally, the user can use this date to determine which cookies to delete from their computer. If no EXPIRES=DATE is set then the cookie will expire at the end of the user's session. A DOMAIN=DOMAIN_NAME parameter is used to store the valid domain to which this cookie will be returned. When a request for a Web page is made its URL is compared to the DOMAIN of cookies stored on the client computer. If a match is found, that cookie is sent along with the request for the Web page to that URL. Matching need not be exact. For example, a technique of "tail-matching" may be used where the URL is compared against the top-level domain and the next level domain up can be used to force the cookie to be sent to a number of related URLs. The default DOMAIN_NAME is the domain of the Web server which generated the cookie. A PATH=PATH parameter is used to specify a subset of the URLs within a domain which are to receive this cookie. If PATH is not specified, it defaults to the path of the Web page described in the requested URL. SECURE is a setting within a cookie that is used to ensure that this cookie will only be returned when the communications channel is secure (e.g., HTTPS).

Microsoft Client Storage library provides "scratch space" for Java applets in the Microsoft SDK for Java, versions 2.0, 2.01, 2.02, 3.0, 3.1, 3.2 and requires features of Internet Explorer (IE) and the Microsoft virtual machine. Scratch space is storage on the client machine that an applet can safely access without needing full access to the client file system. Scratch space is managed by the Microsoft virtual machine to ensure that it cannot be abused by malicious applets. Data stored in scratch space persists across applet invocations and download sites. Applets with the same signer downloaded from multiple sites have access to one unified scratch space, this can be used for storing configuration information for applets that may be used in many places. Scratch space is available in most IE Security Zones by default. The user will generally not be asked to validate use of scratch space. Data within the scratch space is available only to the signer of the applet that created the scratch space. Scratch space provides safety by restricting access to a certain portion of the client directory/file structure; thus applets cannot use scratch space to modify files outside the allowed scratch space area. Applets must be signed or run in a fully trusted zone to use scratch space. Unsigned applets run from a fully trusted zone or from the classpath have their own scratch space. Scratch space can be limited to a fixed amount of disk space. Applets may request more space before the applet starts running, but the user must approve additional space requests. Scratch space usage can be allowed or denied by the security system separately from regular file operations.

SUMMARY OF THE INVENTION

Existing solutions for providing storage to client computer software programs suffer from many problems including: increased bandwidth to read/write data on a server, lack of controlled access to the registry and requirements that client computer software programs (e.g., Web applets) be signed. The Windows registry does not provide controlled storage/access for client-side Web applets. Cookies, stored by a non-JavaScript enabled Web browser, must be accessed by the host server that wrote the cookie in order read/write data values. Cookies provides for storage of data for subsequent access by a host server, but not by the client applet directly. The registry and cookie mechanisms also limit the values it strings and no direct conversion to or from the string data type is provided. Prior art solutions that allow Web applets to store data on a client computer using the native file system poses multiple security issues. Security issues are implicit once access to the native file system is directly opened to Web applets. Alternately, storing data on the host server, while more secure, presents performance problems as Web applets must go back to the server each time they need to read/write data. Systems based on the Microsoft Client Storage library are limited in that they require the applet to be signed using Microsoft Authenticode technology and also require a Microsoft specific version of the Java Virtual Machine ("JVM") in order to execute.

JavaScript, which can be embedded in HTML with the <script> tag, can create, update, get, and delete cookie information. The browser must support JavaScript (and the client must have JavaScript and cookies enabled) for this mechanism to work. Both the Microsoft Internet Explorer and Netscape browser support JavaScript (and the feature in JavaScript called the cookie property of document). The combination of client JavaScript and cookies provides a capability for client-side persistent storage, the cookie mechanism passes the information back to the Web server in each HTTP request/response. Because cookie information is automatically passed backed to the Web server, cookies raise privacy concerns that the present invention does not. Privacy is an issue because information in HTTP request/response headers is stored as plain text, therefore it is susceptible to eavesdropping. Alternatively, if the HTTP request/response headers are encrypted (e.g., by using HTTPS) some users object to information being sent back to a server that they are unable to explicitly see (i.e., hidden). Since the present invent does not require data stored in the repository to be sent back to the server at all, neither the privacy nor the hidden data issues arise. The cookie mechanism also imposes a 4 K byte limit per cookie, this is not a restriction of the present invention.

Thus, an effective technique for solving the problem of providing persistent storage for client computer software programs is required. Accordingly, the present invention provides a repository that enables client computer software programs to store data securely on a client computer system, subsequently retrieve that data, and optionally share the data in a controlled fashion with authorized client computer software programs. The present invention can be used by both trusted and untrusted client computer software programs that either reside locally on the client computer system or are downloaded from a server computer system. Trusted computer software programs may be signed for authentication and download over secure links (e.g., HTTPS).

A benefit of the present invention is that it allows untrusted applets to have access to persistent storage without compromising the integrity of the client computer system. Since the present invention controls persistent storage space, not the programmer of the client computer software program, the burden of insuring storage integrity and security is removed from the programmer. In addition to basic integrity and security features, the present invention provides automatic data format conversion for client computer software programs reading/writing data in the data repository, a commit operation to force in-memory repository data to disk, and automatic expiration to delete the repository after a predetermined time period. The repository can be pre-limited to a maximum size and shared among multiple client computer software programs.

The present invention provides a system and method of managing data for a computer software program downloaded from a server computer system to a client computer system by creating a data repository within the client computer system for storing data without automatic transfer of the data to the server computer system during request/response communications between the client computer system and the server computer system. A URL-based persistent data identifier is created and associated with the data repository. Access to the repository is granted, by the computer software program, by comparing a URL associated with the computer software program to the URL-based persistent data identifier.

In a preferred embodiment of the present invention the data is formatted as a name and value pair, and the data is defined as any serializable data type. The data repository is useful for storing preference data for the user of the computer software program executing on the client computer system as well as for storing data used by an executive system controlling the execution of the computer software program on the client computer system. Operations on the data repository are defined for setting, getting, removing, committing and converting the data from a source data format to a target data format. The operation of committing the data repository is performed automatically upon unloading, suspending or terminating the computer software program.

The persistent data identifier can be created from a file stored in a directory of the server computer system, a URL identifying the computer software program, or a procedure defined in the computer software program. Access to the data repository can then be restricted to computer software programs with the proper persistent data identifier for the data repository. The persistent data identifier is also used to share a data repository among a plurality of computer software programs. Alternately, authentication credentials, stored within the persistent data identifier, can be used to authenticate access to a data repository.

Creating a data repository allows for the supplying of a size parameter to limit the amount of storage the data repository is allowed to use, the size parameter being stored in the persistent data identifier. Additionally, a comment parameter for the data repository is provided to associate a comment with the data repository, the comment parameter being stored in the persistent data identifier. A duration parameter to automatically delete the data upon the expiration of a predefined time limit is also provided and stored in the persistent data identifier. Data repository implementation in a preferred embodiment of the present invention utilizes a file system, or a registry system on the client computer.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. The present invention provides a repository that enables client computer software programs to store data securely on a client computer system, subsequently retrieve that data, and optionally share the data in a controlled fashion with authorized client computer software programs. The present invention can be used by both trusted and untrusted client computer software programs that either reside locally on the client computer system or are downloaded from a server computer system. A key feature in an embodiment of the present invention is its ability to provide client-side persistent data storage for untrusted client computer software programs in a platform independent manner.

In one preferred embodiment of the present invention procedures are defined for {persistent-data}, {get-persistent-data-repository}, {get-persistent-data}, {set-persistent-data} and {commit-persistent-data}. The following description contains examples of programming concepts of the present invention in pseudocode. This code resembles the Curl computer programing language, but is not intended to conform to the syntax of any existing language. The pseudocode is presented to illustrate concepts, not define implementation details.

Figure 1:
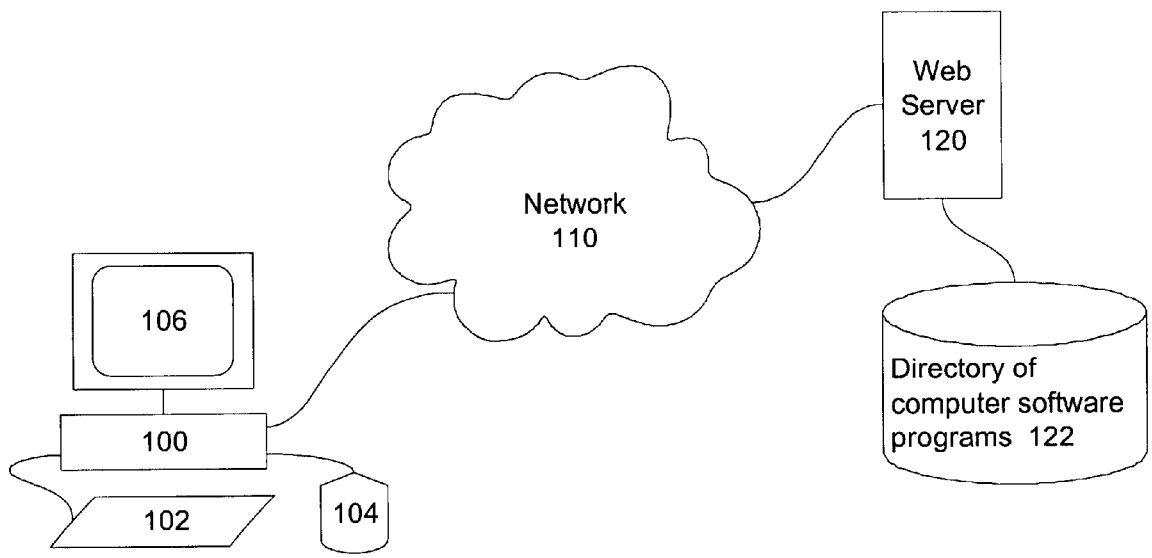
FIG. 1 illustrates a computer system on which an embodiment of the present invention is implemented.

FIG. 1 illustrates a computer system on which an embodiment of the present invention is implemented. A computer 100 provides processing and input/output devices for executing applets that can require the storage of client data. Computer 100 is connected to a keyboard 102 and pointing device 104 for receiving input and a display 106 for presentation of content. Computer 100 is also linked to a network 110 having access to Web server 120. The network can be part of the Internet, the worldwide collection of computers, networks and gateways that use the TCP/IP suite of protocols to communicate with one another. The Internet provides a backbone of high-speed data communication lines between major nodes or host computers, consisting of thousands of commercial, government, educational, and other computer systems, that route data and messages. Web servers 120 connected to the network 110 can host computer software programs (applets) for execution on computer 100. These applets are stored in a directory of computer software programs 122 that provides a hierarchical storage system for the computer software programs.

Figure 2:
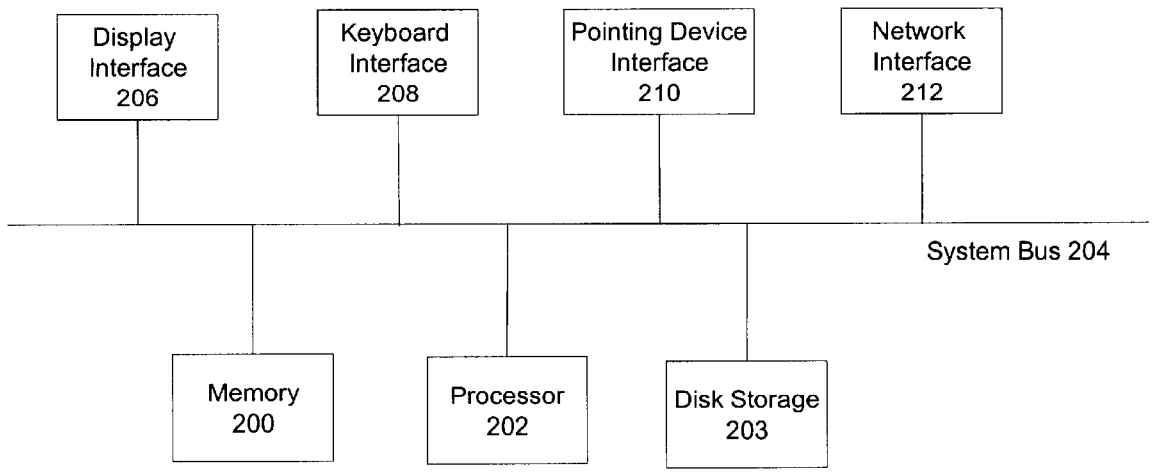
FIG. 2 shows the internal structure of a computer of FIG. 1.

FIG. 2 shows the internal structure of the computer of FIG. 1. The computer 100 and Web server 120 contain a system bus 204; a bus is a set of hardware lines used for data transfer among the components of a computer system. A bus is essentially a shared highway that connects different parts of the system (e.g., processor, disk-drive controller, memory, and input/output ports) and enables the different parts to transfer information. Attached to system bus 204 is display interface 206, which allows display 106 to communicate with other components on system bus 204. Keyboard interface 208 and pointing device interface 210 are also attached to system bus 204 and allow the input devices to communicate with other components on system bus 204. Network interface 212 provides the link to an external network (e.g., network 110) allowing processes running on computer 100 to communicate with Web server 120 connected to a network 110. A memory 200 can store computer software instructions and data structures used to implement an embodiment of the present invention. A processor 202 executes instructions stored in memory 200, allowing the computer 100 to provide persistent storage of client data. A disk storage device 203 is provided for non-volatile storage of the repository (e.g., when the repository is committed).

In a system providing client-side persistent data storage it is often desirable to represent that content using an object-oriented paradigm, in which a system is viewed as a collection of discrete objects that are self-contained collections of data structures and routines having the ability to interact with other objects in the system. Object-oriented systems provide for the definition of classes that can be used to create (instantiate) objects of that class. The objects allow for the encapsulation of data and provide well defined interfaces for other objects to use when sending data to, or receiving data from, an object. One class definition can inherit (subclass) the capabilities of another, allowing more complex classes to be build from simpler, underlying classes. The classes can also specify certain behaviors that are only fully defined at run-time. The combination of features provided in object-oriented systems create a platform for delivering flexible and scalable systems for providing persistent storage of client data.

Figure 3:
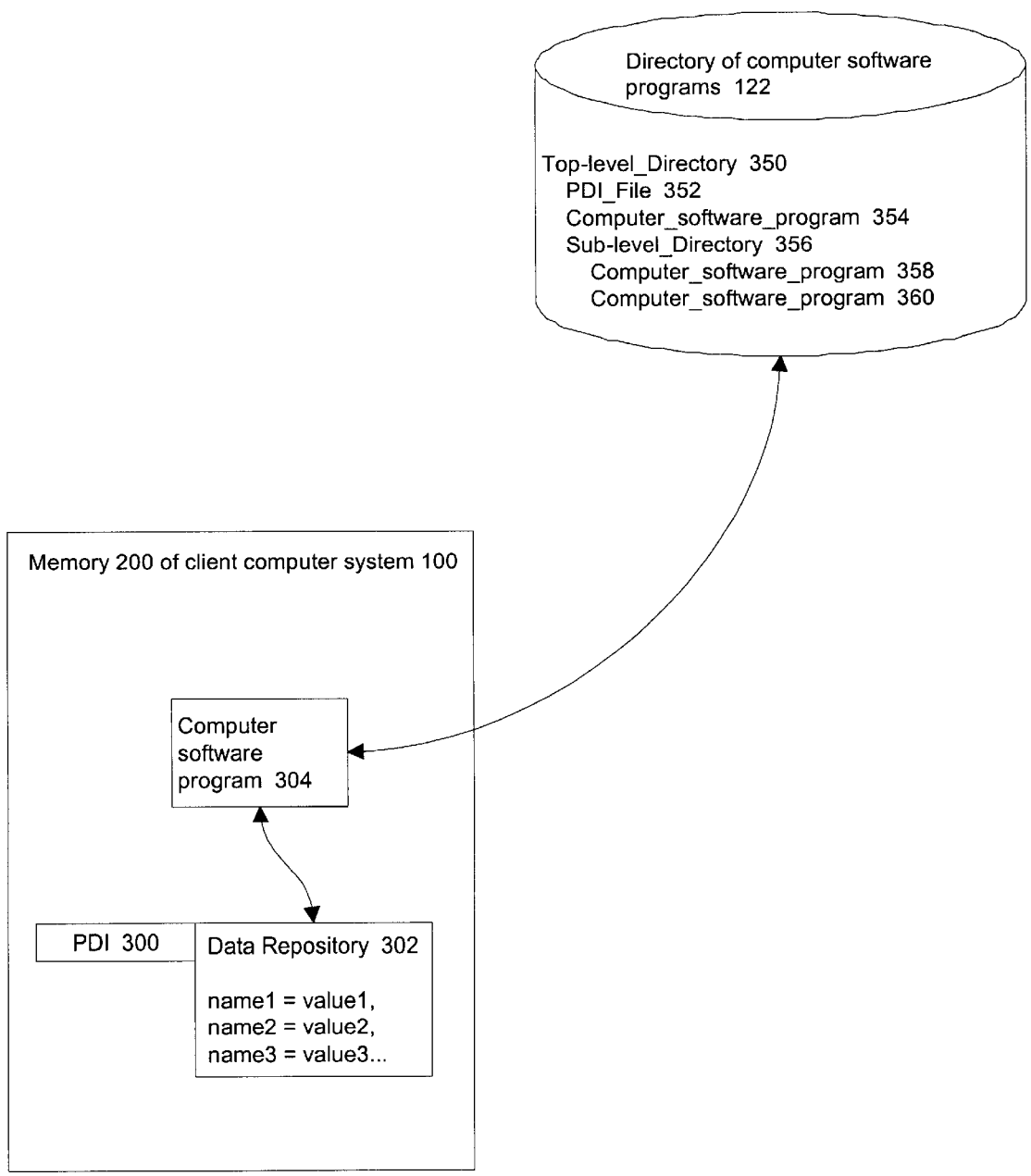
FIG. 3 illustrates a data repository in an embodiment of the present invention.

FIG. 3 illustrates a data repository in an embodiment of the present invention. Client computer software programs 304 (applets) that are loaded from a host directory of computer software programs 122, but are not specified as trusted by the user, are executed in a restricted environment on the client computer system called a "sandbox". One of the restrictions on these untrusted applets 304 is that they cannot read or write files to the file system. This restriction poses problems if an applet 304 needs to store persistent data. Untrusted pages could send and retrieve information to a host system 120, but this is slow, requires increased bandwidth, additional resources on the host system 120 and is not a scalable solution. To solve this problem, the present invention lets an applet 304 store small amounts of persistent data in a data repository 302 on the client computer system 100, this is more convenient than existing systems and allows for storing client data without providing unrestricted access to the full client file system. Access to repository 302 is granted through a persistent data identifier 300. Persistent data storage is also available to trusted applets. Advantages of client persistent data storage include: applets not needing to manage logistics of the storage space (e.g., naming issues), client persistent data storage handles these issues automatically, automatically converting data into a format that can be stored and read from a file (when writing to a file, the programmer needs to make this conversion) and automatically committing data to disk when an applet is unloaded, terminated or suspended.

Client persistent data is stored in persistent data repositories 302 on the client computer system's disk. These repositories 302 store data in name and value pairs (e.g., name1=value1), similar to a hash table. The values are memory representations of objects converted to a format that can be stored on disk. Client persistent data can be set to expire if unused for a certain period of time. The amount of data allowed to be stored in a repository 302 can be limited when the repository 302 is created and data values can be shared between several, related applets.

The simplest form of persistent data to use is stored in private repositories that just one applet 304 can access. Since no other applet 304 needs to access the data, you do not need to identify a specific repository 302 for the data. An embodiment of the present invention uses a default persistent data identifier 300 which is based on the applet's 304 source address (e.g., URL).

Defining a Persistent Data Repository

The data repository 302 is defined by using the {persistent-data} procedure. This procedure call needs to occur at the top-level of an applet (i.e., not within any code block). The procedure call must appear for any attempt to read or store data in the repository 302. An embodiment of the present invention defines the {persistent-data} procedure as follows:

```
Signature:
    public { persistent-data
        comment: String,
        duration : Time=180 days,
        max-size: int={SecurityMgr.get-permissions}.client-data-
        resource.limit},
        credentials: Credentials=null
    } : void
Parameters:
    comment - is a message stored in the repository to explain what
        the repository will be used to store.
    duration - is the amount of time allowed to elapse after the last
        access to the repository before the repository is deleted
        (default is 180 days). This prevents long unused repositories
        from cluttering up the client computer system.
    max-size - is the maximum number of bytes of data allowed
        to be stored in the repository.
    credentials - store key signatures (e.g., X.509 Certificate) used
        for public key encryption mechanism to restrict
        access to the repository to authorized applets.
Returns:
    void.
```

Since a repository can store values of any serializable type, a repository can store another repository. This embedded repository scheme provides for more effective storage management by applets, allowing hierarchical repositories to be created.

In the following example, a call to {persistent-data} defines a small repository 302 used to store a user's client computer system preference data (i.e., the user's favorite color):

```
{persistent-data "Store your favorite color",
    duration=90 days,
    max-size=30
}
```

Simple data types, such as Integer and String can be directly stored. More complex data types/classes can inherit from the Serializable class which ensures instances of the class be converted into a form that the repository 302 can store.

A {persistent-data} procedure can appear in an applet 304 or in an external file (e.g., PDI_File 352). If it appears in an applet 304 it describes a repository 302 private to that applet 304. If it appears in an external file the repository 302 can be shared by other applets 304.

Persistent data is not permanently stored. It can be deleted from the client computer system 100 in two cases: 1) when the repository 302 has not been accessed in the amount of time specified in the duration parameter of the {persistent-data} procedure, the present invention will delete the repository 302 to reclaim the space and 2) when the user invokes the "Delete All Persistent Data" function, all data repositories 302 on the client computer system 100 are deleted. This feature may make persistent data repositories 302 unsuitable for certain applications, for example, if your applet 304 needs to permanently maintain data (such as a receipt for an online transaction) then that data should be stored on a server 120 instead of (or in addition to) the repository 302.

Once defined, a repository can be accessed via {get-persistent-data-repository}, which returns a repository object. The repository object can be used in {get-persistent-data}, {set-persistent-data}, {remove-persistent-data} and {commit-persistent-data} calls. An embodiment of the present invention defines the {get-persistent-data-repository} procedure as follows:

```
Signature:
    public { get-persistent-data-repository
        persistent_data identifier-name:StringInterface=
        {get-the-applet}.url.name}
    }: Repository
Parameters:
    persistent_data_identifier-name - is a filename
        containing a {persistent-data} procedure. The
        {persistent-data} procedure identifies the
        storage that will be accessed when the repository is
        referenced. If the persistent_data_
        identifier-name is not present, a {persistent-data}
        procedure must be present in the applet.
Returns:
    Returns the repository associated with the persistent_data_identifier-name.
```

Storing and Retrieving Persistent Data

Pieces of data stored in a repository are identified by names/keys. A key cannot contain slashes (/), since keys can specify directory paths. Otherwise, there are no restrictions on the definition keys. To store data in the repository 302, the {set-persistent-data} procedure is called, passing in the key that identifies the piece of persistent data, and the value to be stored. After all of the data has been added to the repository 302, a call to {commit-persistent-data} will store the repository 302 to disk. The repository 303 is also committed to disk if the applet 304 is unloaded, including when the client computer system 100 shuts down and when a new applet 304 is load in place of a current one.

To retrieve a persistent data value, a key is passed that identifies the data using the {get-persistent-data} procedure. This procedure returns a value of data type {any} which contains the value stored for the key specified. Setting the optional parameter, {error-if-missing?} to {false}, will cause the procedure to return {null} if the key does not match an entry in the repository 302, otherwise, this procedure throws a {KeyNotFoundException}. In general, it is easier to catch the exception than to determine if the procedure returned {null}.

Data in the repository 304 is stored as key/value pairs. The {set-persistent-data} procedure adds or updates a key/value pair in the repository 302.

```
Signature:
    public { set-persistent-data
        key: String,
        value: any,
        repository: Repository={get-persistent-data-repository}
    } : void
Parameters:
    key - the name associated with the value. {set-persistent-data} will
        throw an error if key is null or the empty string.
    value - the value associated with key. Value must be of a
        type that is Serializable. If the value is not
        Serializable, an exception will be thrown when the
        data is committed.
    repository - identifies the repository to add/update
        the key/value pair. If omitted, the default
        repository for the applet will be used. {set-persistent-
        data} will throw an error if repository is null.
Returns:
    void.
```

Data in is retrieved using key (name) and value pairs. The {get-persistent-data} procedure returns the value associated with a key in the repository.

```
Signature:
    public { get-persistent-data
        key: String,
        repository: Repository={get-persistent-data-repository},
        error-if-missing?: bool=true
    } : any
Parameters:
    key - the name associated with the value. {get-persistent-data} will
        throw an error if key is null or the empty string.
    repository - the repository containing the key/value pair. If omitted,
        the default repository for the applet will be used. {get-persistent-
        data} will throw an error if repository is null.
    error-if-missing? - If set to true (default), {get-persistent-data} will
        throw an exception if a entry for key does not exist in repository.
Returns:
    A value associated with the key in the repository.
```

Data stored in the repository can be removed. The {remove-persistent-data} procedure removes values associated with the specified name/key.

```
Signature:
    public { remove-persistent-data
        key: String,
        repository: Repository={get-persistent-data-repository},
        error-if-missing?: bool=true
    } : void
Parameters:
    key - the name associated with the key/value pair to be removed.
    repository - identifies the Client Persistent Storage Repository to remove
        the key/value pair. See get-persistent-data-repository. If omitted,
        the default repository for the applet will be used. remove-persistent-
        data will throw an error if repository is null.
    error-if-missing? - If set to true, its default value, remove-persistent-data
        will throw an exception if a entry for key does not exist in repository
Returns:
    void.
```

The following example shows operations retrieving and storing a value from a private persistent data repository.

```
{
    || Use a repository to show how many times this page
    has been loaded.
    || Define the parameters for the default repository
    {persistent-data
        "Just a counter needed for an example",
        max-size=10,
        duration=180 days
    }
    {do
        let numtimes:int    || Holds # of times this applet
        has been loaded
        {try    || Be prepared to catch an exception if repository
                || has not yet been created.
                || Get the value from the repository
                set numtimes = {get-persistent-data "times I have run"}
            catch not-found:KeyNotFoundException do
                || The key was not found, so the value has
                not been stored
                || before. Set an initial value of 0
                set numtimes = 0
        }
        || Update the value in the repository
        {set-persistent-data "times I have run", numtimes + 1}
        {commit-persistent-data}
        || Show the results.
        {paragraph This applet has been loaded
            {bold {value numtimes}} times before.
        }
    }
}
```

In contrast to the present invention, the following example shows the inconvenience of using JavaScript and cookies to manage persistent client data:

```
"document.cookie = name + "=" + escape(value) + ";
    expires=" + expdate.toGMTString( );"         // Set a Cookie
"function getCookie (name) {                     // Get a Cookie
        var dc = document.cookie;
        var cname = name + "=";
        var clen = dc.length;
        var cbegin = 0;
        while (cbegin < clen) {
            var vbegin = cbegin + cname.length;
            if (dc.substring(cbegin, vbegin) == cname) {
                var vend = dc.indexOf(";", vbegin);
                if (vend == -1) vend = clen;
                return unescape(dc.substring(vbegin, vend));
            }
            cbegin = dc.indexOf(" ", cbegin) + 1;
            if (cbegin== 0) break;
        }
        return null;
    }"
```

(Note to delete a cookie the cookie's expiration date is set to a date before today's date.)

Sharing Persistent Data

Two or more pages can access a data repository 302 which has been set up to be shared. This lets multiple applets 304 share the same data (e.g., user preferences). To set up a shared repository, a Persistent Data Identifier ("PDI") file (e.g., PDI_File 352) must be created. The Persistent Data Identifier file contains a call to a {persistent-data} procedure which defines the repository 302 that applets 304 need to access. Since the parameters for the repository 302 are set up in this separate file, rather than the applet 304 itself (as is the case with private data repositories) more than one applet 304 can access the repository 302. PDI files are stored on the host server or in the user's application directory. The placement of PDI files determines which applets will have access to the repository. An example PDI file follows:

```
{persistent-data
    "preference settings for our applets",
    max-size=1024,
    duration=90days
}
```

To prevent unauthorized applets from accessing data stored by another, unrelated applet, the present invention limits which repositories an applet can access. Access to the data repository can be based on the URL of the PDI file that defines the repository and the URL of the applet that wants to access it. An applet can access any repository whose PDI file is in a parent or child directory of the directory that contains the applet. Alternatively, access can be control by the credentials stored in the PDI. Access restrictions imposed by credentials override access restrictions imposed by the applet's URL or the PDI file's URL. Note that the physical directory hierarchy on the host does not necessarily have to map directly to the URL hierarchy described.

A directory of computer software programs 122 can contain a plurality of computer software programs 354, 358, 360 stored in various directories, (e.g., Top-level_Directory 350 and Sub-level_directory 356). This directory of computer software programs 122 can be used to store computer software programs hosted by Web server 120. For example, given a computer software program (applet), "example.foo", located at:

"www.foo.com/content/demos/example.foo"

"www.foo.com/content/repository1.foo" would be accessible, since it is located in the "content" directory, which is the parent directory of the "demos" directory that contains the "example.foo" applet.

"www.foo.com/content/demos/data/repository2.foo" is also accessible to the applet, since the directory that contains it (i.e., data) is a child of "demos".

"www.foo.com/content/info/repository3.foo" is not accessible to the applet, since it is located in "info", which is not a direct child or parent of "demos".

The path of the PDI file on Web server 120 bears no relation to the location on the client computer system 100 where the data will actually be stored. The PDI file's location is only relevant when determining which applets 304 will be able to access the data. Note that the physical directory hierarchy on the host does not necessarily have to map directly to the URL hierarchy described.

To access the shared persistent data, an applet must first open the repository 302 that contains the data by instantiating an object of the repository class. Typically, the applet 304 initializes this object with the return from {get-persistent-data-repository}. This procedure takes a string containing the URL of the PDI file that defines the repository 302 to access. For example:

```
{
    let Preference-data: Repository = {get-persistent-data-repository
        "http://www.foo.com/demo/pref-data.foo"}
}
```

An alternate method of providing access to non-shared persistent client data uses a default identifier on the URL of the applet. The URL of the applet is then used in place of the PDI for granting access to the repository 302. Secure protocols, such as HTTPS, guarantee that URL originated from an identifiable host server.

Once the applet 304 has opened the repository, it can access the persistent data by using the {get-persistent-data}, {set-persistent-data}, {remove-persistent-data} and {commit-persistent-data} procedures in the same way they are used to access private persistent data. The only difference is that an additional parameter is provided to specify the repository 302 to use, which is the repository object created earlier. For Example:

```
{
    let Persistent-value: any = {get-persistent-data "times I have run",
                    repository=Preference-data}
    {set-persistent-data
            "favorite color",
            "blue",
            repository=Preference-data}
    {commit-persistent-data
            repository=Preference-data}
}
```

Committing Persistent Data

The {commit-persistent-data} procedure explicitly serializes the key/value pairs in the repository 302 and writes them to permanent storage (e.g., hard drive). All repositories 302 are automatically committed when the applet 304 is unloaded, suspended or terminated. Automatic commitment frees the applet creator from ensuring that every exit from the applet explicitly commits its repositories.

Signature:
   public { commit-persistent-data
      repository: Repository={get-persistent-data-repository}
   } : void
Parameters:
   repository - identifies the repository to commit. If omitted, the default
      repository for the applet will be used. {commit-persistent-data} will
      throw an error if repository is null.
Returns:
   void.

Event Handlers for Repositories

It is often desirable for applets to be able to detect changes in the state of the repository. Multiple applets with access to the same repository may need to coordinate operations, event handlers provide a mechanism to coordinate those operations. For example, when new data is written to the repository an applet may want to write a log record or change a user interface object. A {set-persistent-data-changed-callback} procedure provides a handler that will be invoked whenever the state of a given repository is changed. If a specific name/key value pair has changed that key is passed to the handler.

Signature:
   public { set-persistent-data-changed-callback
      repository: Repository={get-persistent-data-repository},
      handler: {proc-type {repository: Repository, key: String}}, -continued embedded-repositories?: bool = false
   }: void
Parameters:
   repository - identifies the repository to track state changes for. If
      omitted, the default repository for the applet will be used. {set-
      persistent-data-changes-callback} will throw an error if
      repository is null.
   handler - the procedure to call when a state change to the given
      repository is detected.
   embedded-repositories - if true, the handler will be invoked on changes
      to embedded repositories.
Returns:
   void.

Figure 4:
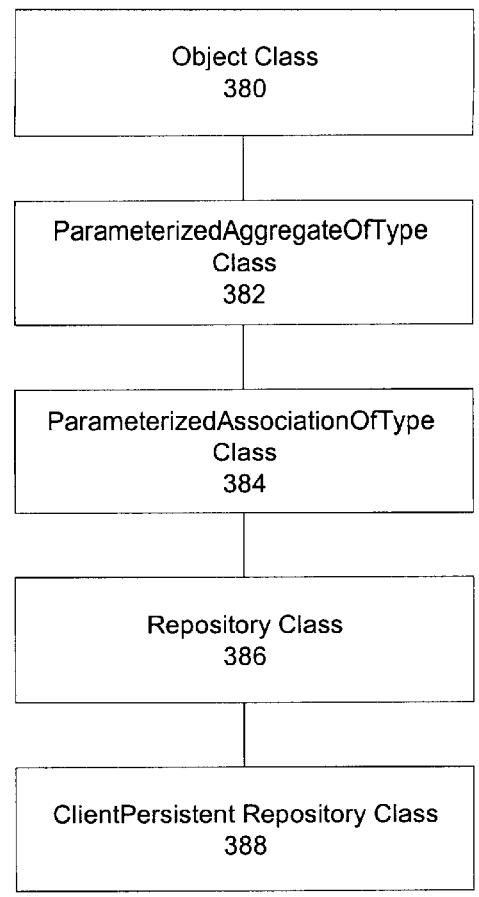
FIG. 4 illustrates class hierarchies for the data repository as defined in an embodiment of the present invention. The Object class 350 is a base class for all other classes and is implicit in their definition.

FIG. 4 illustrates class hierarchies for the data repository as defined in an embodiment of the present invention. The Object class 380 is a base class for all other classes and is implicit in their definition. ParameterizedAggregateOfType class 382 abstracts parameterized classes for collections and ParameterizedAssociationOfType class 384 abstracts parameterized classes for collections and associates a key with and an element. The Repository class 386 provides basic repository functionality. ClientPersistentRepository class 388 is a subclass of Repository class 386 and provides methods and data fields for managing data for a computer software program executing on a client computer system.

Figure 5:
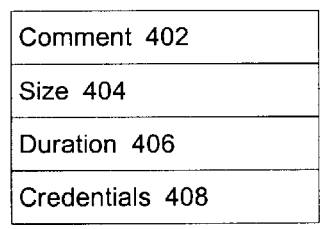
FIG. 5 illustrates a persistent data identifier in an embodiment of the present invention.

FIG. 5 illustrates a persistent data identifier in an embodiment of the present invention. The persistent data identifier 300 is represent as an object containing various descriptive fields. The comment 402 field is a message stored in the repository to explain what the repository will be used to store. The size field 404 contains the maximum number of bytes of data allowed to be stored in the repository. The duration field 406 contains the amount of time allowed to elapse after the last access to the repository before the repository is deleted (default is 180 days). This prevents long unused repositories from cluttering up the client computer system.

The credentials field 408 contains authentication information that can be used to verify the access rights of a user. A secure method of obtaining an authenticated PDI (e.g., via a userid/password scheme) is provided. Where the credentials of a user that may access the repository are not specified in persistent data identifier 300, access permission will be determined by analyzing the applet's root path and the persistent data identifier's path. Access is granted if the applet's root path is an initial sub-path of the persistent data identifier's path, or visa-versa. Additionally, either both the applet's root path and the persistent data identifier's path must start with "https", or neither must. This access algorithm is based upon the idea that applets/files along a given linear path will belong to the same principle, and that the relationship is transitive. In an alternative embodiment, persistent data identifier files may be aggregated into one directory.

The source location field 410 describes the stored location of the repository 302. The repository address field 412 is an internal identifier used to reference the repository 302. The sharing flag field 414 identifies whether or not this PDI 300 is allowed to share access to a repository 302 with another user.

Figure 6:
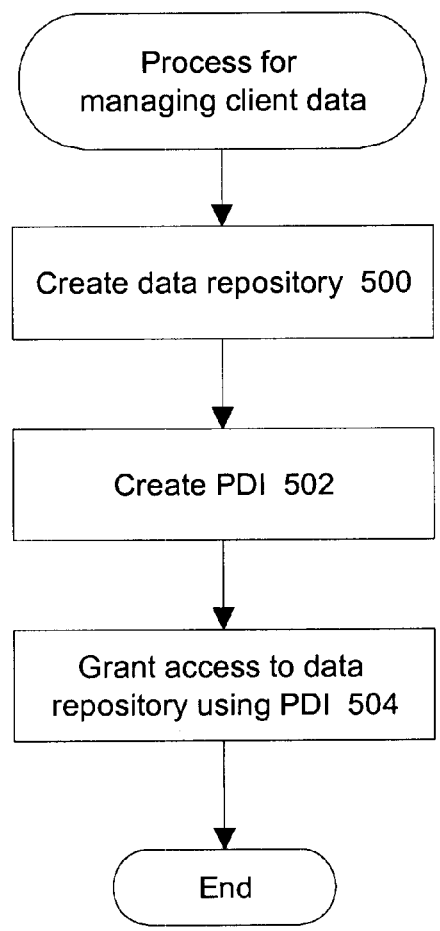
FIG. 6 illustrates a flowchart for managing client data according to an embodiment of the present invention.

FIG. 6 illustrates a flowchart for managing client data according to an embodiment of the present invention. The process of managing data for a computer software program executing on a client computer system starts at Step 500 by creating a data repository within the client computer system for data (e.g., a name and value pair). At Step 502 a persistent data identifier is created and associated with the data repository. At Step 504 the persistent data identifier is used for granting access by computer software program to manipulate the data stored in the data repository.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of managing data for a computer software program downloaded from a server computer system to a client computer system comprising the steps of:

creating a data repository within the client computer system to be accessed by the computer software program for storing data without automatic transfer of the data to the server computer system during request/response communications between the client computer system and the server computer system;

creating a URL-based persistent data identifier associated with the data repository; and granting the computer software program access to the data repository by comparing a URL associated with the computer software program to the URL-based persistent data identifier.

2. The method of claim 1 wherein the data is formatted as a name and value pair.

3. The method of claim 1 wherein granting access further comprises providing operations on the data repository for setting, getting, removing and committing the data.

4. The method of claim 3 wherein the operation of getting the data stored in the data repository further comprises:

converting the data from a source data format to a target data format.

5. The method of claim 3 wherein the operation of setting the data stored in the data repository further comprises:

converting the data from a source data format to a target data format.

6. The method of claim 3 wherein the operation of committing the data repository is performed automatically upon unloading, suspending or terminating the computer software program.

7. The method of claim 1 wherein:

the persistent data identifier is created from a file stored in a directory of the server computer system; and access to the data repository is restricted to computer software programs downloaded from the directory on the server computer system.

8. The method of claim 1 wherein:

the persistent data identifier is created from a URL identifying the computer software program; and access to the data repository is restricted to the computer software program.

9. The method of claim 1 wherein:

the persistent data identifier is created from a procedure defined in the computer software program; and access to the data repository is restricted to the computer software program.

10. The method of claim 1 wherein access to the data stored in the data repository is shared among a plurality of computer software programs using the same persistent data identifier.

11. The method of claim 1 wherein the persistent data identifier comprises authentication credentials.

12. The method of claim 1 wherein the step of creating the data repository further comprises:

supplying a size parameter to limit the amount of storage the data repository is allowed to use, the size parameter being stored in the persistent data identifier.

13. The method of claim 1 wherein the step of creating the data repository further comprises:

supplying a comment parameter to associate a comment with the data repository, the comment parameter being stored in the persistent data identifier.

14. The method of claim 1 wherein the step of creating the data repository further comprises:

supplying a duration parameter to automatically delete the data upon the expiration of a predefined time limit.

15. The method of claim 1 wherein:

the data is defined as any serializable data type.

16. The method of claim 1 wherein the data repository is implemented using a file system on the client computer system.

17. The method of claim 1 wherein the data repository is implemented using a registry system on the client computer.

18. The method of claim 1 wherein:

the data stores preference data for the user of the computer software program executing on the client computer system.

19. The method of claim 1 wherein a portion of the data repository is reserved for use by an executive system controlling the execution of the computer software program on the client computer system.

20. A processor managing data for a computer software program downloaded from a server computer system to a client computer system comprising:

a data repository created within the client computer system to be accessed by the computer software program for storing data without automatic transfer of the data to the server computer system during request/response communications between the client computer system and the server computer system;

a URL-based persistent data identifier associated with the data repository; and a logic unit granting the computer software program access to the data repository by comparing a URL associated with the computer software program to the URL-based persistent data identifier.

21. The processor of claim 20 wherein the data is formatted as a name and value pair.

22. The processor of claim 20 wherein the logic unit further comprises:

setting, getting, removing and committing logic units for operating on the data stored in the data repository.

23. The processor of claim 22 wherein the getting logic unit further comprises:

a conversion unit converting the data from a source data format to a target data format.

24. The processor of claim 22 wherein the setting logic unit further comprises:

a conversion unit converting the data from a source data format to a target data format.

25. The processor of claim 22 wherein the committing logic unit is automatically invoked upon unloading, suspending or terminating the computer software program.

26. The processor of claim 20 wherein:

the persistent data identifier is created from a file stored in the directory of the server computer system; and access to the data repository is restricted to computer software programs downloaded from the directory on the server computer system.

27. The processor of claim 20 wherein:

the persistent data identifier is created from a URL identifying the directory; and access to the data repository is restricted the computer software program.

28. The processor of claim 20 wherein:

the persistent data identifier is created from a procedure defined in the computer software program; and access to the data repository is restricted to the computer software program.

29. The processor of claim 20 wherein the data stored in the data repository is shared among a plurality of computer software programs using the same persistent data identifier.

30. The processor of claim 20 wherein the persistent data identifier contain authentication credentials.

31. The processor of claim 20 further comprising:

a size parameter to limit the amount of storage the data repository is allowed to use, the size parameter being stored in the persistent data identifier.

32. The processor of claim 20 further comprising:

a comment parameter to associate a comment with the data repository, the comment parameter being stored in the persistent data identifier.

33. The processor of claim 20 further comprising:

a duration parameter to automatically delete the data upon the expiration of a predefined time limit.

34. The processor of claim 20 wherein:

the data is defined as any serializable data type.

35. The processor of claim 20 wherein the data repository is implemented using a file system on the client computer system.

36. The processor of claim 20 wherein the data repository is implemented using a registry system on the client computer.

37. The processor of claim 20 wherein:

the data stores preference data for the user of the computer software program executing on the client computer system.

38. The processor of claim 20 wherein a portion of the data repository is reserved for use by an executive system controlling the execution of the computer software, program on the client computer system.

39. A processor for managing data for a computer software program downloaded from a server computer system to a client computer system comprising:

a means for creating a data repository within the client computer system to be accessed by the computer software program for storing data without automatic transfer of the data to the server computer system during request/response communications between the client computer system and the server computer system;

a means for creating a URL-based persistent data identifier associated with the data repository; and a means for granting the computer software program access to the data repository by comparing a URL associated with the computer software program to the URL-based persistent data identifier.

40. A computer program product comprising:

a computer usable medium for managing data for a computer software program downloaded from a server computer system to a client computer system;

a set of computer program instructions embodied on the computer usable medium, including instructions to:

create a data repository within the client computer system to be accessed by the computer software program for storing data without automatic transfer of the data to the server computer system during request/response communications between the client computer system and the server computer system;

create a URL-based persistent data identifier associated with the data repository; and grant the computer software program access to the data repository by comparing a URL associated with the computer software program to the URL-based persistent data identifier.

41. A computer data signal embodied in a carrier wave comprising:

a code segment for managing data for a computer software program downloaded from a server computer system to a client computer system;

a set of computer program instructions embodied on the computer data signal, including instructions to:

create a data repository within the client computer system to be accessed by the computer software program for storing data without automatic transfer of the data to the server computer system during request/response communications between the client computer system and the server computer system;

create a URL-based persistent data identifier associated with the data repository; and grant the computer software program access to the data repository by comparing a URL associated with the computer software program to the URL-based persistent data identifier.

42. A method of managing data for a downloaded computer software program using a URL associated with the downloaded computer software program, the method comprising:

creating a data repository within the client computer system to be accessed by the downloaded computer software program for storing data in the data repository without automatic transfer of the data to the server computer system during request/response communications between the client computer system and the server computer system;

using the URL associated with the downloaded computer software program, creating a URL-based persistent data identifier for the data repository; and granting the computer software program access to the data repository by comparing the URL associated with the computer software program to the URL-based persistent data identifier.

\* \* \* \* \*